United States Patent Office 3,738,971
Patented June 12, 1973

3,738,971
INTERPOLYMERS OF ACRYLATES, UNSATURA-
TED ACIDS AND HYDROXYLATED AMIDES AS
PRESSURE-SENSITIVE ADHESIVES
Alfred M. Coffman, Avon Lake, Ohio, assignor to The
B. F. Goodrich Company, New York, N.Y.
No Drawing. Filed Sept. 7, 1971, Ser. No. 178,462
Int. Cl. C08f 15/00
U.S. Cl. 260—80.73                                6 Claims

ABSTRACT OF THE DISCLOSURE

Pressure-sensitive adhesives having an excellent balance of tack and strength are prepared by polymerizing together (1) a major amount of an alkyl acrylate wherein the alkyl group contains at least 6 carbon atoms, (2) a minor amount of an $\alpha,\beta$-olefinically unsaturated carboxylic acid, and (3) a small amount of an $\alpha,\beta$-olefinically unsaturated hydroxylated amide and (4) optionally an alkyl acrylate wherein the alkyl group contains 4 to 5 carbon atoms. The pressure-sensitive adhesives are particularly useful as transparent tape adhesives.

BACKGROUND OF THE INVENTION

The use of alkyl acrylates to prepare pressure-sensitive adhesives is known in the art. To be used as adhesives for transparent tapes, decorative tapes, and the like, the balance between tack and strength is especially critical. For these applications, the adhesive must exhibit "quick-grab" as evidenced by wettability and instantaneous adhesion, and have high cohesive strength but low peel strength.

Known pressure-sensitive adhesive compositions have excellent tack or high cohesive strength, but these properties have always been somewhat mutually exclusive of each other. A pressure-sensitive adhesive having an improved balance of these properties is highly desirable.

SUMMARY OF THE INVENTION

Pressure-sensitive adhesive polymers have been discovered that have an improved balance of instantaneous adhesion and wettability when applied to a surface and of high cohesive strength and low peel strength. The polymers contain (1) from about 76% to about 98% by weight of an alkyl acrylate wherein the alkyl group contains at least 6 carbon atoms, (2) from about 2% to about 4% by weight of an $\alpha,\beta$-olefinically unsaturated carboxylic acid, and (3) greater than 0.01% to about 0.15% by weight of an N-alkylol amide of an $\alpha,\beta$-olefinically unsaturated carboxylic acid. The polymers are particularly useful in the preparation of transparent pressure-sensitive adhesive tapes, decorative tapes, and like articles.

DETAILED DESCRIPTION

Tests have been developed by the pressure-sensitive adhesive trade to evaluate potential adhesives. A review of the tests and properties of adhesives is found in Adhesives Age, October 1968, pp. 28–35.

Wettability is the ability of the adhesive upon contact with a smooth surface, to spread out and wet the entire contact area under no pressure other than the weight of the tape alone. Instantaneous adhesion is measured in the Rolling Ball Tact Test, call letter PSTC-6 (10/64) of the Pressure Sensitive Tape Council. The test measures the ability of a pressure-sensitive adhesive tape to stop a 7/16 inch diameter steel ball rolled down an incline onto the tape. A stopping distance on the tape of one inch or less indicates excellent instantaneous adhesion.

In addition to "quick-grab," the tape must be able to readily support a weight and yet be easily peeled from a surface if desired. The balance between cohesive strength and peel strength is important. The cohesive strength is measured in a 20° angle Shear Test. In this test, one end of an adhesive tape is pressed onto a smooth surface such that the total contact area between tape and surface is ¼ square inch. The free end of the tape is attached to a 400 gram weight. The smooth surface is then tilted 20° from perpendicular so that the tape and weight hand at a 20° angle from the surface. This results in both a shear and a peel force on the adhesive. The time the adhesive supports the weight is measured. A support time of 30 minutes is satisfactory, a time of 60 minutes is good, and a support time of over 200 minutes is considered excellent. Peel strength is determined, following PSTC-1, as the force necessary to peel back at an angle of 180°, a one inch wide adhesive tape from a smooth aluminum panel at a rate of 12 inches per minute. For easy removal the peel strength should be low; around 2 lbs./inch is desirable.

The major essential monomer type used in the preparation of the desired polymers is an alkyl acrylate of the formula

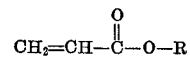

wherein R is an alkyl group containing at least 6 carbon atoms. Examples of such acrylates are hexyl acrylate, heptyl acrylate, n-octyl acrylate, isooctyl acrylate, 3-methylpentyl acrylate, 2-ethylhexyl acrylate, decyl acrylate, dodecyl acrylate, n-pentadecyl acrylate, n-octadecyl acrylate, and the like. The preferred acrylates have alkyl groups containing 8 to 10 carbon atoms such as n-octyl acrylate, isooctyl acrylate, 2-ethylhexyl acrylate, decyl acrylate, and the like. The range of use of the acrylates is from about 76% to about 98% by weight based upon the weight of the monomers. A more preferred range is from about 81% to about 98% by weight.

Other vinylidene ($CH_2=C<$) monomers may be used in partial replacement of the alkyl acrylates described above. The amount of other vinylidene monomer used varies as to its effect on the Tg (glass transition temperature) of the polymer. For example, using 97 parts by weight of the essential alkyl acrylates as a basis, up to about 5 parts of a high Tg (over 50° C.) producing monomers such as styrene and its substituents, vinyl chloride, acrylonitrile, methacrylonitrile, methacrylates, and the like may be used in place of equal parts of acrylate. Likewise, up to about 10 parts of monomers such as vinyl acetate, methyl and ethyl acrylate, vinyl ethers, acrylamides and methacrylamides, and the like can be used in replacement; up to about 20 parts of alkoxy acrylates, n-butyl and n-pentyl acrylate, and the like can be used in partial replacement of an equal number of parts of essential acrylate. Normal butyl acrylate and n-pentyl acrylate are particularly useful in partial replacement of the described essentail acrylates.

The second essential monomer type is an $\alpha,\beta$-olefinically unsaturated carboxylic acid. Examples of such are acrylic acid, methacrylic acid, ethacrylic acid, itaconic acid, citraconic acid, maleic acid, allyl acetic acid, and the like and anhydrides thereof. Preferred monomeric acids are the α,β-monoolefinically unsaturated monocarboxylic acids having 3 to 6 carbon atoms such as acrylic acid, methacrylic acid, and the like. The range of use of these monomeric acids is from about 2% to about 4% by weight.

The third essential monomer type is an α,β-olefinically unsaturated hydroxylated amide, as the N-alkylol amides of α,β-olefinically unsaturated carboxylic acids. Preferred are the N-alkylol amides of α,β-olefinically unsaturated monocarboxylic acids containing 4 to 10 carbon atoms. Examples of such are N-methylol acrylamide, N-methylol methacrylamide, N-methylol maleamide, N-propanol acrylamide, N-methylol-p-vinyl benzamide, and the like. Most preferred because of their availability and cost are the N-alkylol amides of α,β-monoolefinically unsaturated monocarboxylic acids such as N-methylol acrylamide, N-methylol methacrylamide, and the like. Also useful are the hydroxy methyl derivatives of diacetone acrylamide of the formula

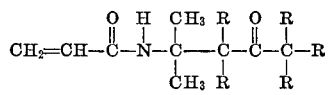

wherein R is —H or —CH$_2$OH and the number of hydroxyl groups is at least one. The monomers are preferably used in the range from about 0.04% to about 0.15% by weight based upon the weight of the monomers charged. A more preferred range is from about 0.05% to about 0.10% by weight. Particularly useful pressure-sensitive adhesive polymers contain from about 2.90% to about 2.95% by weight of monomeric acid and from about 0.05% to about 0.10% by weight of monomeric hydroxylated amide.

The polymers are readily prepared in solution, suspension, and emulsion polymerization processes employing those conditions and techniques known to the art. The polymerization is a free-radical process using free-radical generating catalysts such as benzoyl peroxide, hydrogen peroxide, dicumyl peroxide, cumene hydroperoxide, potassium persulfate, sodium persulfate, azo-bis-isobutyronitrile and the like. Redox systems may be used; and a combination of ultra-violet light and photosensitive agents such as organic diazo compounds, organic disulfides, benzophenone, triphenyl phosphine, and the like can be employed to initiate free-radical polymerization.

Since the polymers have particular utility as adhesives, an efficient method is to prepare the polymers in a solution polymerization so they can be stored and applied directly from the polymer solution without having to recover them. Useful solvents for the polymerization include any organic solvents capable of dissolving the monomers and polymer made. Examples of solvents are benzene, toluene, ethyl acetate, hexane, heptane, cyclohexane, acetone, methylethyl ketone, and the like. It is preferable to use a solvent that will vaporize readily after the polymer solution has been applied to a backing. Particularly useful solvents are ethyl acetate and methylethyl ketone/cyclohexane mixtures.

The polymers can be made in a batch or a continuous process. A molecular weight modifier such as a primary aliphatic mercaptan may be used. The polymerization temperature ranges from about 0° C. to about 80° C., whereas a more preferred range is from about 40° C. to about 60° C. The polymerizations run to essentially 100% conversion of monomers and a typical polymerization time would be about 10 hours. Although the polymers can be conveniently stored and used directly from the polymerization solutions, if desired, they can be recovered from solution via coagulation with water, alcohol/water mixes, direct drying, and other known recovery techniques.

The polymers are characterized by having a solution viscosity ranging from about 25,000 cps. to about 200,000 cps. as measured at 25° C. with a Brookfield model LVT viscometer using spindle #7 at 10 r.p.m. on a 50% by weight solution of polymer in a mixture of 20 parts by weight of methylethyl ketone and 80 parts by weight of cyclohexane.

The polymer can also be characterized by recovering it, heating the polymer for 15 minutes at 140° C., and testing for the amount of crosslinking. The polymers have a Williams Plasticity (WP) value ranging from about 1.7 mm. to about 2.8 mm., and more preferably from about 2.0 mm. to about 2.6 mm., as measured using a Williams parallel plate plastometer. The value is the height in millimeters of a 2.0 gram ball of polymer after being pressed under a 5 kilogram load for 14 minutes at 100° F. Weight percent gel and volume percent swell of the gel can also be used to characterize the crosslinked polymers. The weight percent gel range is from about 20% to about 60% by weight of the polymer. The percent swell range is from about 20% to about 150% by volume, while a more preferred range is from about 40% to about 100% by volume.

Weight percent gel and volume percent swell are measured in the same test. 0.5 gram of polymer are admixed with 100 milliliters of methyl ethyl ketone in a Pyrex bottle which contains a screen rack of five 50 mesh screens. The mixture sets at room temperature for 16 hours and then the screen rack is withdrawn. Weight percent gel is determined by running a total solids on the solution to measure percent soluble polymer and the difference calculated. Volume percent swell is determined by weighing the solvent swollen insoluble gel on the screens and comparing this weight to the dry gel weight.

The adhesive compositions of this invention have particular utility as transparent tape adhesives. Suitable backings for these applications are films of cellulose acetate, cellophane, polyethylene terephthalate (Mylar), propylene, and the like. The adhesives can also be readily used to make decorative tapes, masking tapes, adhesive emblems, and like articles. Typical backings would be cotton, rayon, nylon, silk, vinyl films, metal foils, and rubber and resin impregnated paper.

The polymer is applied to the backing material from solution using a doctor blade, roll coating, spraying, drawing, transfer coating or like techniques. The solution film laid down must be sufficiently thick to leave a deposited polymer layer of from about 0.5 mils to about 5 mils in thickness after the solvent evaporates. The polymer solution/backing composite is then heated to 140° C. for 15 minutes to flash off the solvent and lightly crosslink the polymer. The adhesive articles prepared required no further heat treatment to exhibit their desired properties of tack and strength.

The particular novelty of the polymers of this invention over known pressure-sensitive adhesive polymers is in their excellent balance between instantaneous adhesion and cohesive strength as measured in the Rolling Ball Tack Test and the 20° angle Shear Test. The polymers also have excellent wettability when applied to a surface, spreading out under no pressure other than the weight of the backing. And, although they have good cohesive strength, they have peel strengths around 2 lbs./inch so they can be easily removed from a surface and, when removed, they leave no deposit or residue on the surface.

EXAMPLES

A series of solution polymerizations were made using a mixture of 80 parts by weight of cyclohexane and 20 parts by weight of methylethyl ketone as the solvent. Samples 6, 11 and 12 employed 97.5 parts by weight of cyclohexane and 24.5 parts by weight of methylethyl ketone as the solvent. The recipes and polymerization data can be seen in the following table. The ingredients are given in parts by weight,

| | 1 | 2 | 3 | 4 | 5 | 6 | 7 | 8 | 9 | 10 | 11 | 12 |
|---|---|---|---|---|---|---|---|---|---|---|---|---|
| Ethylhexyl acrylate | 97 | 97 | 87 | 87 | 97 | 97 | 86 | 87 | 87 | 97 | 97 | 57 |
| n-Butyl acrylate | | | 10 | 10 | | | 10 | 10 | 10 | | | 40 |
| Acrylic acid | 2.85 | 2.90 | 2.92 | 2.94 | 2.95 | 2.96 | 3.90 | 2.94 | 2.945 | 2.97 | 2.8 | 2.8 |
| N-methylol acrylamide | 0.15 | 0.10 | 0.08 | 0.06 | 0.05 | 0.04 | 0.10 | 0.06 | 0.055 | 0.025 | 0.2 | 0.2 |
| Benzoyl peroxide | 0.15 | 0.15 | 0.15 | 0.15 | 0.15 | 0.15 | 0.15 | 0.15 | 0.15 | 0.15 | 0.15 | 0.15 |
| Polymerization time, hrs | 66 | 64 | 64 | 64 | 64 | | 64 | | | 64 | 70 | 64 |
| Temperature, °C | 55 | 50 | 45 | 45 | 50 | 40 | 50 | 45 | 45 | 45 | 55 | 60 |
| Percent conversion | 100 | 100 | 100 | 100 | 100 | 100 | 100 | 100 | 100 | 100 | 100 | 100 |
| Solution viscosity, cps | 43,000 | 61,000 | 180,000 | 152,000 | 58,000 | 30,000 | 140,000 | 61,000 | 62,400 | 45,800 | 8,400 | 16,600 |

Samples 1 to 7 and 10 to 12 were batch charged into a reactor vessel and heated and agitated for the indicated times. Samples 8 and 9 were handled similarly except that the benzoyl peroxide catalyst was proportioned throughout the run. Samples 10 to 12 were prepared using recipes outside of the specifications of this invention. Percent conversions were determined from percent total solids measurements.

All of the samples were evaluated as transparent tape pressure-sensitive adhesives. The polymer solutions were applied to a Mylar (polyethylene terephthalate) film using a 3 mil draw bar. The solution coated films were heated to 140° C. for 15 minutes. The resultant polymer films were about 1 to 1.5 mils in thickness. The adhesive tapes were then evaluated on the Rolling Ball Tack Test, the 20° angle Shear Test, and checked for peel strength and wettability. A small portion of each polymer solution was dried down to obtain a sample for property analysis. After being cured at 140° C. for 15 minutes, each polymer sample was analyzed for weight percent gel and volume percent swell, and for its Williams Plasticity. Property data and pressure-sensitive adhesive test results are listed in the following table.

| | 1 | 2 | 3 | 4 | 5 | 6 | 7 | 8 | 9 | 10 | 11 | 12 |
|---|---|---|---|---|---|---|---|---|---|---|---|---|
| Weight percent gel | 53 | 42 | 39 | 31 | 30 | 36 | 44 | 52 | 39 | 0 | 54 | (6) |
| Volume percent swell | 36 | 46 | 57 | 95 | 87 | 63 | 48 | 39 | 67 | 0 | 29 | (6) |
| Williams plasticity, mm | 2.8 | 2.1 | 2.3 | 2.1 | 1.7 | 1.8 | 2.4 | 2.5 | 2.2 | 1.5 | 2.4 | 2.1 |
| 20° shear, minutes | [2]45 | [5]98 | [4]70 | [5]197 | [3]44 | [3]40 | [1]53 | [1]240 | [1]240 | [1]6 | [1]11 | [1]28 |
| Rolling ball tack, inches stopping distance | 0.3 | 0.3 | 0.2 | 0.4 | (6) | (6) | (6) | 0.2 | 0.2 | (6) | (6) | (6) |

[1] One test.  [2] Average of 2 tests.  [3] Average of 3 tests.  [4] Average of 4 tests.  [5] Average of 5 tests.  [6] Not tested.

Samples 1 to 9 demonstrate an excellent balance of instantaneous adhesion and cohesive strength and show the criticality of the composition on the performance of the adhesives. All of the adhesives had peel strengths of about 2 lbs./inch, and all showed good wettability on a smooth clean glass surface. The adhesives of this invention are useful at low temperatures, the compositions having glass transition temperatures (Tg) down to −60° C. (Sample 2) as determined by Differential Thermal Analysis.

I claim:

1. Pressure-sensitive adhesive polymers having a solution viscosity ranging from about 25,000 centipoises to about 200,000 centipoises measured at 25° C. on a 50% by weight solution of polymer in a mixture of 20 parts by weight of methylethyl ketone and 80 parts by weight of cyclohexane comprising (1) from about 76 percent to about 98 percent by weight of an alkyl acrylate wherein the alkyl group contains at least 6 carbon atoms and up to 18 carbon atoms, (2) up to 20 percent by weight of an alkyl acrylate wherein the alkyl group contains 4 to 5 carbon atoms, (3) from about 2 percent to about 4 percent by weight of an α,β-olefinically unsaturated mono- or dicarboxylic acid, and (4) greater than 0.01 percent to about 0.15 percent by weight of an α,β-olefinically unsaturated hydroxylated amide selected from the group consisting of N-alkylol amides of α,β-olefinically unsaturated carboxylic acids and hydroxymethyl derivatives of diacetone acrylamide of the formula

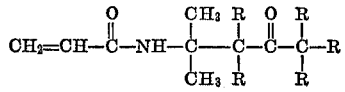

where R is —H or —CH$_2$OH and the number of hydroxyl groups is at least one, all weights based upon the weight of the polymer.

2. A polymer of claim 1 containing from about 81 percent to about 98 percent by weight of an alkyl acrylate wherein the alkyl group contains 8 to 10 carbon atoms, (2) up to about 15 percent by weight of an alkyl acrylate wherein the alkyl group contains 4 to 5 carbon atoms, (3) from about 2 percent to about 4 percent by weight of an α,β-monoolefinically unsaturated monocarboxylic acid having 3 to 6 carbon atoms, and (4) greater than 0.01 percent to about 0.15 percent by weight of an N-alkylol amide of an α,β-monoolefinically unsaturated monocarboxylic acid selected from the group consisting of N-methylol acrylamide, N-methylol methacrylamide, and N-propanol acrylamide.

3. A polymer of claim 2 containing (1) from about 81 percent to about 98 percent by weight of 2-ethylhexyl acrylate, (2) up to about 15 percent by weight of normal butyl acrylate, (3) from about 2 percent to about 4 percent by weight of acrylic acid, and (4) from about 0.05 percent to about 0.10 percent by weight of N-methylol acrylamide.

4. A polymer of claim 3 comprising about 97 percent by weight of 2-ethylhexyl acrylate, from about 2.90 percent to about 2.95 percent by weight of acrylic acid, and from about 0.05 percent to about 0.10 percent by weight of N-methylol acrylamide.

5. A polymer of claim 3 comprising about 87 percent by weight of 2-ethylhexyl acrylate, about 10 percent by weight of n-butyl acrylate, from about 2.90 percent to about 2.95 percent by weight of acrylic acid, and from about 0.05 percent to about 0.10 percent by weight of N-methylol acrylamide.

6. A polymer of claim 5 comprising about 87 percent by weight of 2-ethylhexyl acrylate, about 10 percent by weight of n-butyl acrylate, about 2.94 percent by weight of acrylic acid, and about 0.06 percent by weight of N-methylol acrylamide.

References Cited

UNITED STATES PATENTS 3,637,615   1/1972   Coffman _____ 260—80.73

JOSEPH L. SCHOFER, Primary Examiner

S. M. LEVIN, Assistant Examiner

U.S. Cl. X.R.

117—132 C, 138.8 F, 138.8 N, 138.8 UA, 145, 155 UA; 260—66, 78.5 R